June 9, 1964  H. R. BRUET  3,136,189
MACHINE TOOLS PROVIDED WITH CIRCULAR ROTARY ABUTMENTS
Filed Aug. 1, 1960  5 Sheets-Sheet 1
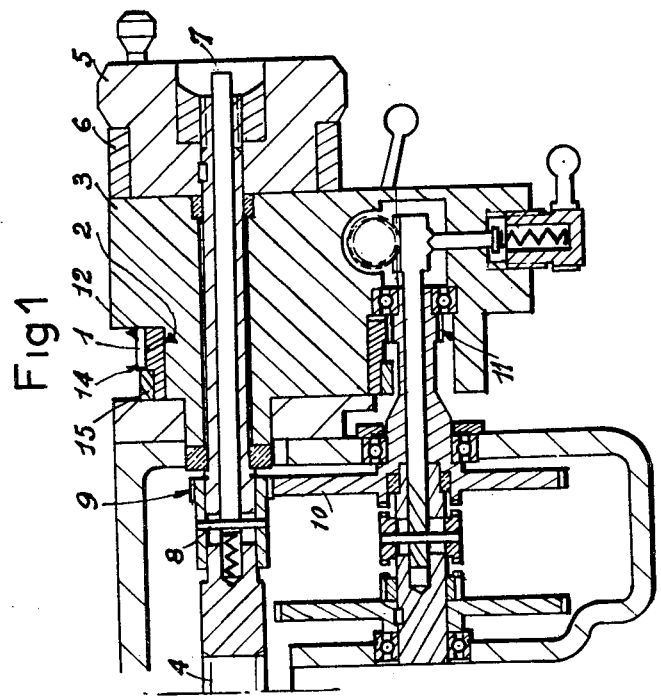
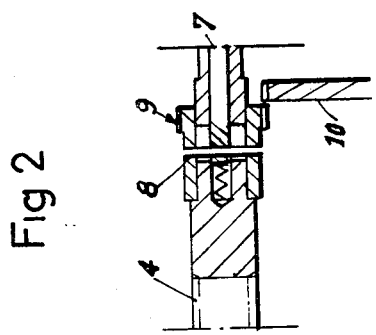
Inventor
HENRI RENÉ BRUET
By Toulmin & Toulmin
Attorneys June 9, 1964 H. R. BRUET 3,136,189
MACHINE TOOLS PROVIDED WITH CIRCULAR ROTARY ABUTMENTS
Filed Aug. 1, 1960 5 Sheets-Sheet 2

Inventor
HENRI RENÉ BRUET
By Toulmin & Toulmin
Attorneys

June 9, 1964   H. R. BRUET   3,136,189
MACHINE TOOLS PROVIDED WITH CIRCULAR ROTARY ABUTMENTS
Filed Aug. 1, 1960   5 Sheets-Sheet 3
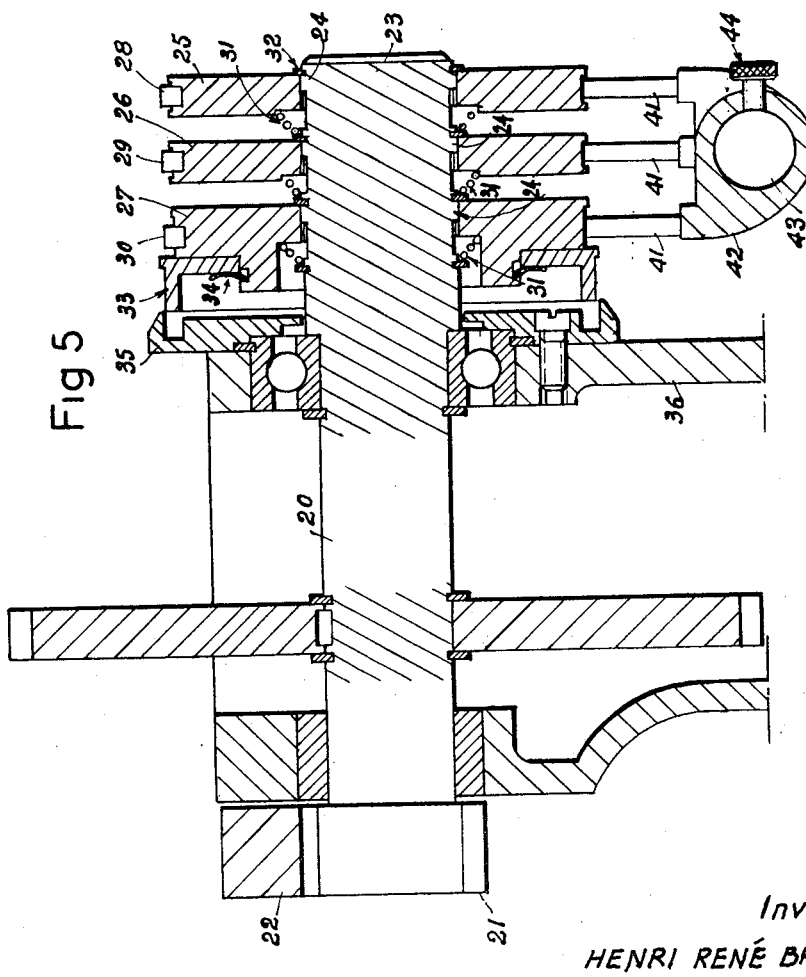
Inventor
HENRI RENÉ BRUET
By Toulmin & Toulmin
Attorneys

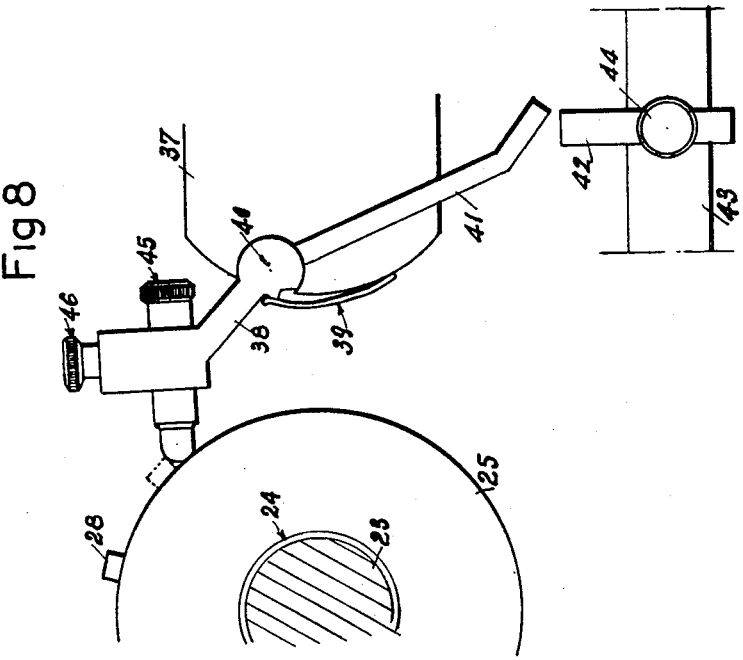
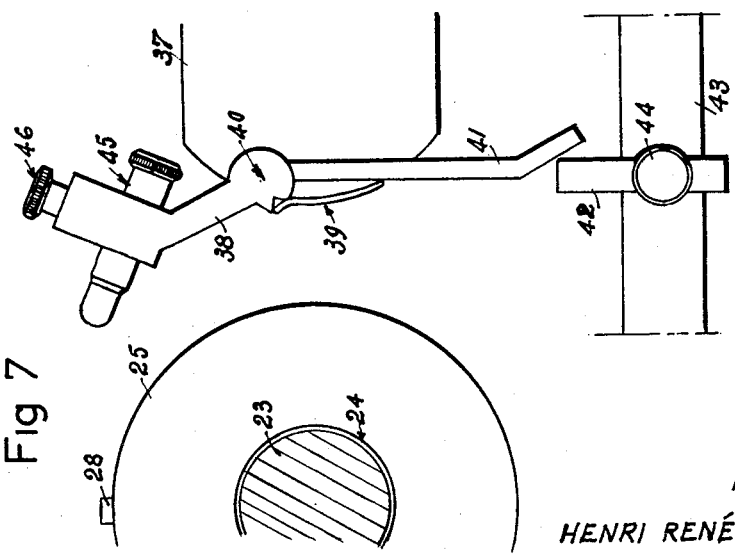

June 9, 1964 H. R. BRUET 3,136,189
MACHINE TOOLS PROVIDED WITH CIRCULAR ROTARY ABUTMENTS
Filed Aug. 1, 1960 5 Sheets-Sheet 5

Fig 9

Inventor
HENRI RENÉ BRUET
By Toulmin & Toulmin
Attorneys

United States Patent Office 3,136,189
Patented June 9, 1964

3,136,189
MACHINE TOOLS PROVIDED WITH CIRCULAR ROTARY ABUTMENTS
Henri René Bruet, Paris, France, assignor to Etablissements A. Cazeneuve, La Plaine-Saint-Denis, France, a French company
Filed Aug. 1, 1960, Ser. No. 46,505
Claims priority, application France Sept. 2, 1959
3 Claims. (Cl. 82—21)

The present invention relates to adjustable abutments or stops used in machine tools for limiting the longitudinal travel and the transverse travel between the tools and the work to be machined, in particular in lathes.

It resides more particularly in the application to machine tools of cihcular rotary abutments and in the arrangement of such circular rotary abutments whereby they permit distances between abutments of sufficient length to meet all normal needs both for transverse travels and for longitudinal travels, said arrangement preferably being such that said abutments are easily manipulated, adjustable rapidly and accurately and within view of the user who can easily verify their movement and watch over their cleanliness during machining.

The machine tools arranged in accordance with the invention are therefore characterised in that they comprise circular rotary abutments whose rotary parts are respectively connected by a speed reducing transmission to the lead screw (or other shaft controlling the transverse carriage) and mounted on the shaft of the pinion of the longitudinal travel rack or on an auxiliary shaft whose rotary speed can be if desired reduced relative thereto.

Preferably, for the purpose of a rapid and easy adjustment, the rotary parts of said abutments are easily disconnectable, as concerns rotary motion, from the mechanisms effecting the transverse or longitudinal travels, for example by the disengagement of grooves, notches or teeth, advantageously in opposition to the action of a spring which constantly urges them into engagement.

The ensuing description and the accompanying drawings, given merely by way of example, will permit a full understanding of the invention and will disclose other important additional features.

FIGS. 1, 2, 3 and 4 show the arrangement of a circular rotary abutment on the cross slide of a lathe.

FIGS. 5, 6, 7, 8 and 9 show the arrangement of a group of abutments on the longitudinal slide of a lathe.

Figure 3:
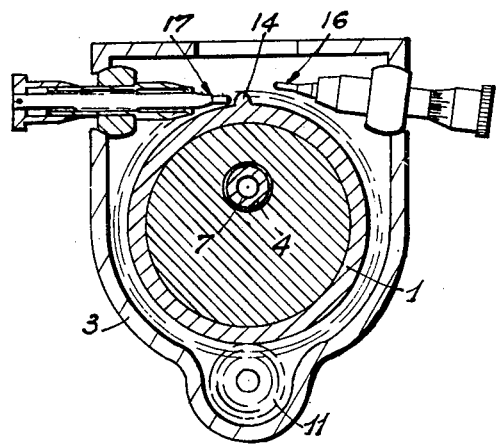
Figure 4:
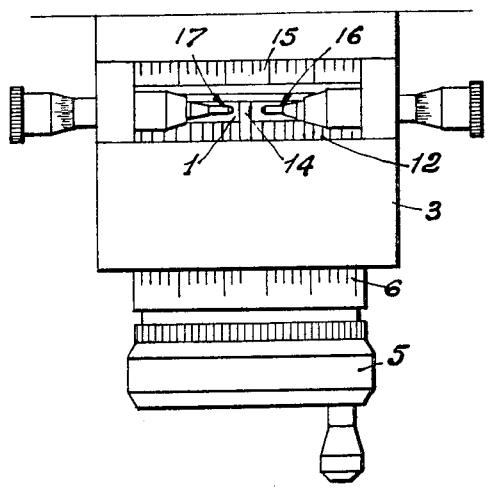

With reference to FIGS. 1, 2, 3 and 4, the abutment body 1 is rotatable on a bearing 2 provided on a support 3 through which extends the screw 4 of the cross slide controlled by the hand wheel 5 provided with a vernier 6. Slidable within and coaxially of the screw 4 is a rod 7 through which extends a pin 8 and which permits controlling the longitudinal and rotational movement of the pinion 9 which latter can, moreover, be mounted on sliding flutes (not shown) on the screw 4. The pinion 9 meshes with a gear 10 on whose shaft is machined a gear 11 which meshes with a gear 12 rigid with the abutment body 1 provided with a stop member 14. A vernier 15 is provided on the body 1, which is advantageously constituted by the gear 12 machined on the entire width of the body 1 and thereafter milled circularly so as to remove the teeth on a part of its width except for one tooth 14 which constitutes said stop member. Tangentially disposed relative to the body 1 are two stopping means 16 and 17 located on either side of the support 3 and capable of being withdrawn by rotation about pins such as 18. FIG. 3 shows the stopping means 16 in its withdrawn position and the stopping means 17 in its stopping position. The stopping means 16 and 17 are preferably adjustable by a micrometer.

Owing to this arrangement, the cross slide can come to a stop position over a long travel. The latter is a function of the gear ratio between the gears 9, 10, 11 and 12 and the lead of the screw 4. If the ratio of the gears in question is for example 20:1, which is conceivable, and the lead of the screw 4 is five millimetres there would be a travel of the cross slide of about a hundred millimetres for one revolution of the abutment body 1 and its stop member 14, to within the thickness of the stop member tooth.

The abutment can be adjusted with precision at any point in this travel in the following manner:

The rod 7 is depressed so as to disengage the pinion 9 from the gear 10, as shown in FIG. 2. The abutment body 1 is then released and it can be rotated so as to find the abutment position to within one tooth. This having been done, the gear 9 is re-engaged with the gear 10 and the final adjustment of the required abutment position is terminated by actuating the micrometer devices of the stopping means 16 and 17 in accordance with the direction of rotation of the abutment body 1.

It will be observed that during machining, the user is able to watch not only the vernier 6 but the vernier 15 which indicates the position of the stop member 14. This permits bringing about the stoppage of the transverse travel at the right time and to come safely to a stop. The user can moreover easily watch over the cleanliness of the abutment in question and eliminate foreign bodies which, in intervening, could impair the precision of the work.

For the longitudinal travel, the circular rotary abutments are advantageously disposed on the shaft 20 of the rack pinion 21 meshed with the rack 22.

The extension 23 of the shaft 20 carries flutes 24 in the largest possible number. Engaged with these flutes are the corresponding flutes broached in the three abutment bodies 25, 26 and 27 provided with stop members 28, 29 and 30. These abutment bodies 25, 26 and 27 are maintained in the engaged position in the flutes 24 by the thrust of springs, such as 31, which bias them against stops, in the presently described embodiment, rings 32. Mounted on the abutment body 27 is a vernier 33 pinched by an elastic washer 34 which permits its rotational displacement, if desired, for the purpose of adjustment, relative to the stop members 28, 29 and 30. Disposed in front and coaxially of the vernier 33 is an index plate 35 fixed to the saddle 36. Pivoted at 40 to the block 37 rigid with the saddle 36 are withdrawable stopping means 38 which are maintained either in the withdrawn position (FIG. 7) or in the stopping position (FIG. 8) by spring strips 39. The stopping means 38 are provided with bars 41 whose free ends are capable of encountering, during the longitudinal travel of the saddle 36, a block 42 fixed in suitable position by a screw 44 on a shaft 43 rigid with the lathe bed (not shown). A single block, such as 42, could be used for all the bars, such as 41, or an adjustable block for each of said bars. The stopping means, such as 38, are provided with a screw adusting device 45 which is arrested in the correct position by a screw 46.

For one revolution of the abutment bodies 25, 26 or 27, the longitudinal travel of the saddle 36 corresponds to the length of the pitch circle of the rack pinion 21 so that, in this case, the stop position possibilities of the longitudinal travel are within the limits of this length.

To obtain greater stop lengths, the block 42 is used, it being fixed on the shaft 43 at a position which corresponds to the required stop length. When the saddle 36 moves from right to left, the abutment bodies 25, 26 and 27 rotate in a clockwise direction and the stop members 28, 29 and 30 pass under the stopping means, such as 38, placed in the withdrawn position as shown in FIG.

7. The abutment bodies can thus effect a number of revolutions or a portion of a revolution which corresponds to a longitudinal travel equal to this revolution multiplied by the length of the circumference of the pitch circle of the rack pinion 21, without abutment occurring. But when the bars, such as 41, encounter the block 42 suitably positioned on the shaft 43, they cause the pivoting about the pin 40 of the stopping means, such as 38, which bring their screws 45 up to the bodies 25, 26 and 27 where they are encountered by the stop members 28, 29 and 30 and the stop position is reached.

During the return travel of the saddle 36 from the left to the right, the abutment bodies 25, 26 and 27 rotate in the counterclockwise direction so that the stop members 28, 29 and 30 raise the stopping means, such as 38, which are finally returned to the withdrawn position (FIG. 7) by the bars 41 when they encounter the left side of the block 42.

The adjustment of the stop positions of the stop members 28, 29 and 30 is rapidly effected in a suitably close manner, in the following way:

Taking the body 25 as an example, it is pushed in opposition to the action of the spring 31 so as to disengage its flutes from the flutes 24 which connect it to the shaft 20. It is now possible to rotate it so as to bring its stop member 28 to the nearest position, to within one flute, to the stop position; thereafter its flutes are re-engaged with the flutes 24 and the screw 45 is then rotated to bring the stopping means 38 to the exact stop position. This having been done, the selected index on the vernier 33 is brought into the correct reading position relative to the divisions formed on the index plate 35.

In the same way as with the cross slide circular rotary abutment, the user is able to observe continuously during machining, all the verniers and stops relating to the longitudinal travel; he is able to observe their movement and verify their cleanliness. He can thus deliberately bring about the stoppage of the longitudinal travel so as to come safely to the stop position.

The number of abutment bodies, which is three in the presently described embodiment, can be as desired, according to needs, and these abutment bodies could be mounted on an auxiliary shaft which rotates, if desired at reduced speed, relative to the shaft of the rack pinion.

An automatic means for stopping the cross slide and longitudinal slide when they reach their stop positions could be provided if desired.

If desired, an automatic withdrawing device for the stopping means similar to that for the longitudinal slide could be provided for the cross slide.

It must be understood that the previously described devices are given merely by way of example, the invention not being limited thereto but embracing all like or similar arrangements comprising all or a part of said arrangements, and all applications to machine tools and particularly lathes.

What I claim is:

1. A machine tool provided with guide means, a tool carrying support movable along said guide means and guided thereby; driving means including a manually rotatable screw threaded driving shaft having an axial bore therethrough and carried by said support for moving said support along said guide means; an adjustable circular rotary abutment carried by said tool support for limiting the stroke of said support along said guide means and including a stop member and a rotatable member engageable with said stop member to be stopped thereby; said adjustable abutment being connected to said driving means so as to be rotatable thereby in response to the support travel along said guide means; an auxiliary rotatable shaft carried by said tool support; means for reducing the speed from said screw threaded shaft to said auxiliary shaft so that said auxiliary shaft is rotated at a reduced speed; said speed reducing means including a pinion slidably keyed on said screw threaded shaft, a push rod slidably keyed on said screw threaded shaft, a push rod slidably engaged within the axial bore of said screw threaded shaft and connected to said pinion to be movable therewith along said shaft, and resilient means for urging said push rod outwardly of the shaft at one end thereof and for urging said pinion into a position wherein said pinion is an operative member of said speed reducing means with said pinion being inoperative when moved to a position corresponding to said push rod being pushed within said shaft axial bore against said resilient means whereby said auxiliary shaft is loosened and said rotatable member is easily and quickly adjustable.

2. A machine tool as in claim 1, wherein said support is provided with a bearing at a distance around said screw threaded shaft and in eccentric position with reference therewith, said circular rotary abutment member resting on said bearing, and said stop member being carried by said support.

3. A machine tool as in claim 2, wherein said stop member is swingly supported to swing about an axis parallel with the screw threaded shaft axis and transverse to its own length, thereby to be movable out of the path of said rotary abutment, and of variable length, and micrometer means to vary said length, i.e. the distance between said swinging axis and the stop member point adapted to engage said rotary abutment.

References Cited in the file of this patent

UNITED STATES PATENTS

| | | |
|---|---|---|
| 1,235,437 | Chard | July 31, 1917 |
| 1,248,941 | Sosa | Dec. 4, 1917 |
| 2,160,966 | Groene et al. | June 6, 1939 |
| 2,297,501 | Roloff et al. | Sept. 29, 1942 |
| 2,319,480 | Saving et al. | May 18, 1943 |
| 2,362,275 | Jacobs | Nov. 7, 1944 |
| 2,450,788 | Foster | Oct. 5, 1948 |